United States Patent
Choi

(10) Patent No.: US 9,965,191 B2
(45) Date of Patent: May 8, 2018

(54) ELECTRONIC SYSTEM WITH MESSAGE MECHANISM AND METHOD OF OPERATION THEREOF

(71) Applicant: Samsung Electronics Co., Ltd., Suwon-si, Gyeonggi-Do (KR)

(72) Inventor: Changho Choi, Fremont, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 178 days.

(21) Appl. No.: 14/674,906

(22) Filed: Mar. 31, 2015

(65) Prior Publication Data
US 2016/0117100 A1 Apr. 28, 2016

Related U.S. Application Data

(60) Provisional application No. 62/069,703, filed on Oct. 28, 2014.

(51) Int. Cl.
*G06F 3/06* (2006.01)
*G06F 13/38* (2006.01)

(52) U.S. Cl.
CPC .............. *G06F 3/061* (2013.01); *G06F 3/067* (2013.01); *G06F 3/0659* (2013.01)

(58) Field of Classification Search
None
See application file for complete search history.

(56) References Cited

U.S. PATENT DOCUMENTS

| | | |
|---|---|---|
| 5,937,435 A | 10/1999 | Dobbeck et al. |
| 6,892,274 B2 | 5/2005 | Nalawadi et al. |
| 7,010,638 B2 | 3/2006 | Deng et al. |
| 8,417,866 B2 | 4/2013 | Chang et al. |
| 2013/0275652 A1* | 10/2013 | Simionescu .......... G06F 3/0607 711/103 |
| 2015/0220277 A1* | 8/2015 | Lee ........................ G06F 3/064 711/103 |

* cited by examiner

*Primary Examiner* — Scott Sun
(74) *Attorney, Agent, or Firm* — IP Investment Law Group

(57) ABSTRACT

An electronic system includes: a storage interface unit configured to receive an I/O command request with a logical block address field; a logical block address message unit, connected to the storage interface unit, configured to extract an embedded message from the logical block address field; and a storage controller unit, connected to the logical block address message unit, configured to process the embedded message.

20 Claims, 3 Drawing Sheets

ELECTRONIC SYSTEM WITH MESSAGE MECHANISM AND METHOD OF OPERATION THEREOF

CROSS-REFERENCE TO RELATED APPLICATION

This application claims the benefit of U.S. Provisional Patent Application Ser. No. 62/069,703 filed Oct. 28, 2014, and the subject matter thereof is incorporated herein by reference thereto.

TECHNICAL FIELD

An embodiment of the present invention relates generally to an electronic system, and more particularly to a system with an increased messaging capability.

BACKGROUND

Electronic systems and industrial electronics, especially compute systems, control systems, and devices such as cellular phones, navigations systems, portable digital assistants, and combinations of systems and devices, are providing increasing levels of functionality to support demands of modern life. Efficient and expedient access to data of storage devices by the systems and devices continually grow as research and development in the existing technologies take a myriad of different directions.

The increasing demand for efficient and expedient access to storage devices in modern life requires the combinations of systems and devices to access information at any time, while data rates continue to increase and data latencies continue to decrease. Interface between host systems and storage devices are not efficient.

Thus, a need still remains for an electronic system to provide an improved and more efficient messaging capability with storage devices. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and to meet competitive market pressures, adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including a storage interface unit configured to receive an I/O command request with a logical block address field; a logical block address message unit, connected to the storage interface unit, configured to extract an embedded message from the logical block address field; and a storage controller unit, connected to the logical block address message unit, configured to process the embedded message.

An embodiment of the present invention provides a method of operation of an electronic system including: receiving an I/O command request with a logical block address field; extracting an embedded message from the logical block address field; and processing the embedded message.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1A:
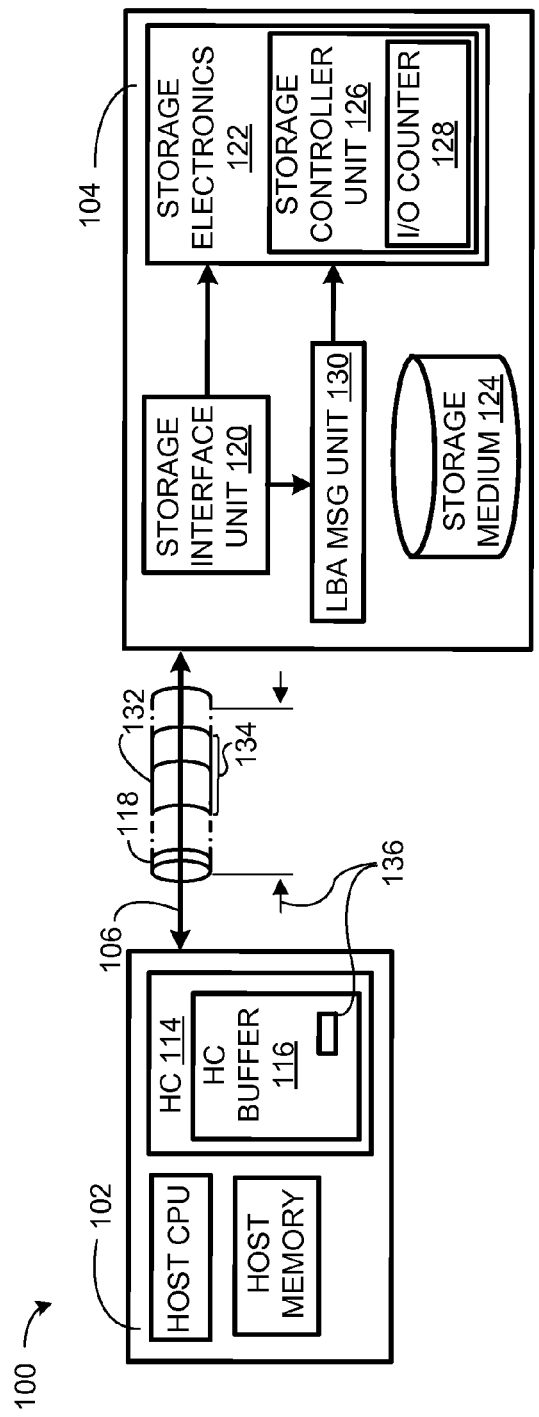
FIGS. 1A and 1B, show an electronic system with a messaging mechanism in various embodiments of the invention.

Embodiments provide substantially more in-band messaging capacity and bus utilization without impacting bus I/O performance, costs, or command latency by providing the capability of applying and executing more than one message in-band with an I/O command request through allocating, assigning, and configuring a portion of the unused bits of the LBA field for an embedded message and another embedded message, which results in two different message fields in-band within a single I/O command request.

Embodiments provide maximum functional utilization, minimal circuitry interaction, and minimal development/product cost by having the LBA message unit detect, extract, analyze, and pre-process the message field independently and without assistance from the storage controller unit. Also, the storage controller and the storage electronics independent processing of the I/O command requests with the native LBA field without any assistance from the LBA message unit enables the storage controller unit to process or execute the messaging information from the LBA message unit in parallel or concurrent with the processing of the I/O command requests.

Embodiments provide savings in development, product, manpower, and parts cost for the developers, manufacturers, and end consumers since the circuitry can be implemented and added to any device having a storage medium, with a logical block addressing scheme, such as the LBA field. Further, these savings can also be attained irrespective of interface type, physical interface medium, or type of host controller. This further allows for the circuitry to be easily incorporated into the device to provide the functionality and benefits of the message mechanism.

Embodiments provide an architecture that reduces development, debug, and time to market due to the leverageable and scalable architecture of the message mechanism that enables replication of all or portions of the LBA message unit to provide the capability for multiple parallel messages, such as one, two, three, or more than three parallel messages, to be executed in-band per I/O command request.

Embodiments provide improvement of efficiency and utilization of the storage device interface and with no perceivable overhead or performance impact to the operation of the host, the storage device interface, the data storage device, or any combination thereof. This improvement stems from the data storage device working with the storage interface unit, the LBA message unit, or a combination thereof, to provide the host with the capability to send an embedded message within the LBA field in-band with an I/O command request to the data storage device to provide additional command or informative messages without additional I/O command.

Embodiments provide additional granularity control when the embedded message is to be processed or executed, and with which I/O command request the embedded message is to be executed in-band. The additional granularity control discovery is provided by the functions and options of various combinations of the I/O index count, the message controller unit, the offset tag handler unit, and the message memory unit in conjunction with the pipeline used to form the pipeline architecture. The pipeline architecture provides the data storage device the capability to control and offset the shortened message received from the host before processing or executing the embedded message in-band with an I/O command request that is different from the I/O command request originally used by the host to send (in-band) the embedded message.

Embodiments of the message mechanism can provide a new unlimited messaging capacity for the host for improved host I/O task management and performance as a result of the storage device including the offset tag handler unit, the offset tag field, the I/O index count, the message indicator detector unit, the message evaluator unit, and the message decoder unit of the LBA message unit to provide additional parallel processing capability to handle many embedded message fields received in-band within I/O command requests received from the host.

Embodiments provide for double the messaging payload capacity to increase messaging efficiency by using the offset tag handler unit, the offset tag field, the I/O index count, the message controller unit, the message memory unit, the I/O counter, and the storage controller unit. The additional messaging payload capacity provide the data storage device with the capability to process or execute an embedded message and a shortened message (sent from the host in-band with a different I/O command request) in-band with a single I/O command request to enable processing two messages in parallel.

Embodiments optimize the performance of the electronic system by providing increased in-band messaging payload process/execution capacity while maintaining the throughput, performance, and data bandwidth throughout the electronic system with the message mechanism. The message mechanism is based on the offset tag handler unit, the offset tag field, the I/O index count, the I/O command counter unit, the message indicator detector unit, the message evaluator unit, the message decoder unit, the message controller unit, the message memory unit, the I/O counter, and the storage controller unit. The message mechanism provides the data storage device with the capability to process or execute two or more embedded messages sent in-band with a first I/O command request and at least one shortened message sent from the host in-band with a second I/O command request. The message mechanism further provides the capability to process, execute, or any combination thereof, three messages in-band with the first I/O command request.

Embodiments eliminate or prevent design/development co-dependencies or bottlenecks between the hardware of the host and software of the data storage device to minimize development work, mitigate risks, and reduce product costs and time to market for developers and manufacturers of the hosts and the data storage devices. The hardware engineers for the host can be agnostic to the message mechanism since adding the hardware units and circuitry of the LBA message unit and circuit modifications to the storage controller unit to process and execute the message field are external to the host. The software engineers for the data storage device can be agnostic to the message mechanism software since software changes are in the host for proper use, interpretation, and relationships of the message field and the native LBA field of the LBA field, and not in the data storage device.

Embodiments provide for unlimited messaging capacity for future generations of the electronic system to provide improved and more efficient messaging capability with data storage devices by including the offset tag handler unit, the offset tag field, the I/O index count, the message indicator detector unit, the message evaluator unit, the message decoder unit of the LBA message unit, the pipeline, and replication combination thereof. Embodiments provide additional parallel processing capability to process or execute many embedded message fields received in-band with the I/O command requests from the host.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments can be numbered first embodiment, second embodiment, etc. as a matter of descriptive convenience and are not intended to have any other significance or provide limitations for an embodiment of the present invention.

The term "processing" as used herein includes manipulating signal and corresponding data, such as filtering, detecting, decoding, assembling data structures, transferring data structures, manipulating data structures, and reading and writing data structures. Data structures are information arranged as symbols, packets, blocks, files, input data, system generated data, such as calculated or generated data, and program data. The term "in-band" as used herein refers to an additional method or operation executed concurrently with an existing method or operation, such as a command or informational message to prepare for hardware execution, processing, or configuration/reconfiguration, performed without any performance, latency, or observable change to the existing method or operation.

Figure 1B:
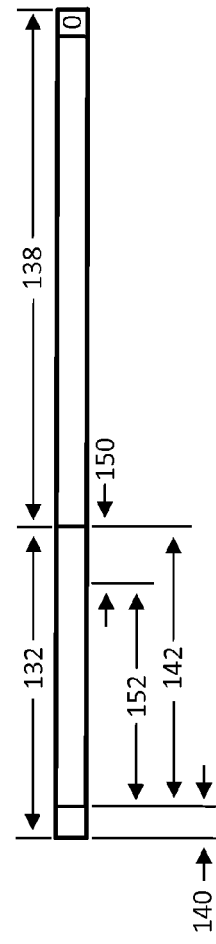

Referring now to FIGS. 1A and 1B, therein is shown an electronic system 100 with a messaging mechanism in various embodiments of the invention. FIG. 1A shows the electronic system 100 can include a host 102 connected to a data storage device 104 by a storage device interface 106. The host 102 can be a computing device with processing capabilities and access to storage. Examples of the host 102 can include a desktop, a workstation, a laptop, a notebook computer, a server, a mobile device, a router, or a storage server. The host 102 can access storage internal to the host 102 or external to the host 102.

The host 102 can include a Host Central Processing Unit (HCPU), a host memory, and a host controller (HC) 114 with a HC buffer 116. The HCPU can be a processor or compute unit for performing system controls, analysis, operations, various tasks and functions, or any combination thereof. The host memory can include volatile and non-volatile memory for use by the HCPU and applications. The host controller 114 can be used by the host 102 to communicate with the data storage device 104 using the storage device interface 106. Types of host controller 114, for example, can include an Advanced Technology Attachment 2 (ATA-2), Parallel Advanced Technology Attachment (PATA), Small Computer System Interface (SCSI), Serial Attached SCSI (SAS), PCIe, NVMe, Serial Advanced Technology Attachment (SATA), Fibre Channel Interface (FCI), a native operating Firewire/ 1394, or a Redundant Array of Inexpensive Disks Host Bus Adapter (RAID) host controller.

The host controller 114 can be an adapter used to connect the host 102 to the storage device interface 106 by converting content of the host 102 to or from another form by translating the content. Examples of the signal forms can include digital signals, analog signals, optical signals, sonic signals, or radio frequency signals, such as Wireless Local Area Network (WLAN), or Bluetooth. Examples of the translated content can include encryption/decryption, scrambling, spread spectrum transmission, Code Division Multiple Access (CDMP), Global System for Mobile (GSM), 8b/10b encoding and decoding, 64b/66b encoding or decoding, or any combination thereof.

The storage device interface 106 can be used to physically transmit/receive signal information between the host controller 114 and data storage device 104. The storage device interface 106 can be configured to include different physical interface mediums, different interface configurations, or any combination thereof. Examples of the different physical interface mediums can include transmission on or in conductive wire or backplane with traces, fiber optic cable, hollowed waveguides and space, such as air, atmosphere, or any combination thereof. Examples of the different interface configurations can include a serial, a parallel, or any combination of configurations thereof.

Examples of the parallel interface configurations can include the PATA, the ATA-2 to ATA-6, or the SCSI. Examples of serial interface configurations can include the SATA (also known as "Serial ATA"), a Serial Attached SCSI (SAS), a native operating FCI, or a native operating Firewire/1394 interface. Internal circuitry of the host controller 114 can be used to encode, decode, format, and electrically convert information sent to or received from the data storage device 104.

The HC buffer 116 can be used by the host controller 114 to store, order, or modify digital information, before the digital information sent out on the storage device interface 106 or received by the host controller 114 from the storage device interface 106. Examples of the digital information sent to the host 102 from the data storage device 104 can include read data, configuration settings, status/information, or error information.

Examples of the data information sent to the data storage device 104 from the host 102 can include numbers, write data, an I/O command request 136 to be executed by the data storage device 104, configuration settings, or status/information. The I/O command request 136 is a payload of many bytes used to represent an operation request, address locations, and specific instructions/options relating to the operation.

The I/O command request 136 can include one or more bytes to indicate a command code 118, a Logical Block Address (LBA) field 134, and a message field 132. The command code 118 can indicate a specific type of read or write operation to be performed by the data storage device 104. The command code 118 can be a portion of an I/O command request 136 transmitted across the storage device interface 106 to the data storage device 104. Examples of the command code 118 operations include read long, read direct memory access, read stream external, write direct memory access, write sectors, write log, write stream, or write multiple external.

The LBA field 134 can contain a finite number of bits to represent values used by hardware to locate/identify a specific block of data in the data storage device 104. All of the bits of the LBA field 134 can support a maximum value representing a maximum number of specific blocks of data. The maximum number of specific blocks of data and the number of bytes per block of data can be used to determine an absolute maximum storage capacity limit of the storage medium 124.

As an example, to avoid performance, cost, and catastrophic data loss issues, data storage devices 104 are not necessarily designed and manufactured to operate to the absolute maximum storage capacity limit and all of the bits of the LBA field 134 are not utilized. These non-utilized bits of the LBA field 134 can be allocated and used to generate the message field 132.

The message field 132 can be used for the messaging mechanism and is further described in detail later. The data storage device 104 can include a storage interface unit 120, storage electronics 122, a storage medium 124, a logical block address (LBA) message unit 130, and circuitry within the data storage device 104.

The storage interface unit 120 can initially receive electrical signals from the storage device interface 106. The storage interface unit 120 can process the electrical signals to generate formatted digital data and control signals that can be used by the LBA message unit 130, and subsequently, used by the storage controller unit 126, any of the electronics within the data storage device 104, or combination thereof, for example.

The storage interface unit 120 can also send information and data to the host 102 using the storage device interface 106 in a manner similar to the host controller 114 transmission of data to the data storage device 104. The storage data from the data storage device 104 can, for example, include data read from the storage medium 124, status of the data storage device 104, progress of a command execution, setup/configuration validation from the data storage device 104, or any combination thereof.

The LBA message unit 130 can generate messaging information used by the storage controller unit 126 of the storage electronics 122. The processing path from the storage interface unit 120 and the LBA message unit 130 to the storage controller unit 126 can be a piped process. The piped process begins at the storage interface unit 120 and closely followed by the LBA message unit 130. After a pre-determined designed delays, the pipe exits at the storage controller unit 126.

At the exit/end of the pipe, the storage controller unit 126 can receive the formatted digital data and control signals from the storage interface unit 120. The storage controller unit 126 can also receive commands, the command codes 118, I/O command request 136 requests, and data sent from the host 102 for processing by the storage electronics 122, and can have immediate access to messaging information generated earlier in the pipe by the LBA message unit 130. Detection of the command code 118 by the storage controller unit 126 at the end of the pipe can be used to trigger circuitry of the data storage device 104 to immediately process and execute the I/O operation or task.

The storage controller unit 126 can also include an I/O counter 128. The I/O counter 128 is a counter used by the storage controller unit 126 to track and identify each of the I/O command requests 136 received by the storage controller unit 126. The I/O counter 128 can be initially reset to a value of zero before any read or write I/O command request 136 is received by the storage controller unit 126. The I/O counter 128 can be incremented by the storage controller unit 126 with each read or write I/O command received by the storage controller unit 126. Values of the I/O counter 128 can be used by the storage controller unit 126 to detect and match/pair up the messaging information generated by the LBA message unit 130 with a specific read or write I/O command request 136 received by the storage controller unit 126.

The storage electronics 122 can execute tasks received from the storage interface unit 120, the storage controller unit 126, or any combination thereof. Examples of tasks include reliably reading/writing the storage medium 124, managing and monitoring the functionality of the data storage device 104, or a combination thereof. The storage electronics 122 can also process and respond to commands/requests from the host 102 that include performing unique user or manufacturer proprietary tasks, such as hardware/software tests, debug, or diagnostics.

The storage medium 124 can be a non-volatile storage or volatile device that can include one or more magnetic disc/platters, optical disc/platters, solid state semiconductor based memories, molecular based memories, or any combination thereof, as examples. The storage medium 124 can also include volatile storage memory, for buffering, staging, or caching information, such as Random Access Memory (RAM), Dynamic Random Access Memory (DRAM), Static Random Access Memory (SRAM), Synchronous Dynamic Random Access Memory (SDRAM), Double Data Rate (DDR) SDRAM, DDRx SDRAM variants (and x is an integer power of 2), or any combination thereof.

FIG. 1B provides further details about the LBA field 134 of the I/O command request 136 received from the storage device interface 106. The LBA field 134 represents the field received, detected, and processed by the storage interface unit 120 for the LBA message unit 130 to extract an embedded message 142. The embedded message 142 of the LBA field 134 is a messaging mechanism feature of the data storage device 104 to receive messages, from the host 102, in-band with the I/O command request 136 received from the host 102.

The embedded message 142 can be formed by bits allocated and located between a message indicator bit 140 of the LBA field 134 and the most significant bit of a native LBA field 138 of the LBA field 134. The message indicator bit 140 is the most significant bit of the message field 132 and corresponds to the most significant bit of the LBA field 134.

The message indicator bit 140 can be used to indicate/validate the presence of one or more of the embedded messages 142 in the LBA field 134. The storage interface unit 120 can receive the I/O command request 136 having the LBA field 134 which includes the message field 132 with bits of the embedded message 142 sent from the host 102 to the data storage device 104 using the storage device interface 106.

If and when the message indicator bit 140 is set, such as to a high level or a one, the message indicator bit 140 can indicate that one or more of an embedded messages 142 of the I/O command request 136 are present and valid. The combination of the message indicator bit 140 and fields of the embedded message 142 can form the message field 132. The message indicator bit 140 can be used by circuitry to validate/indicate the presence of at least one message that requires processing.

In an alternative embodiment, the host 102 can configure the LBA message unit 130 to only process and receive LBA fields 134 having a single embedded message 142. The message indicator bit 140 and usage of the message indicator bit 140 can be ignored. With the message indicator bit 140 ignored, the detection and validation of an embedded message 142 can be inferred when any of the unused bits of the LBA field 134 are detected active or set to a value of one by the circuitry of the LBA message unit 130.

The native LBA field 138 can be referenced by the command code 118 as the starting data block for any of the I/O command requests 136. The total number of bits allocated as the native LBA field 138 can be based on the largest block address accessible in the storage medium 124, by the operating system of the host 102, by Basic Input/Output System (BIOS) of the host 102, within a limitation or restriction of configured or set by the host 102, or any combination thereof.

The native LBA field 138 of the LBA field 134 can be used to address any of the supported data blocks of the storage medium 124. Some or all of any unused bits of the LBA field 134, not allocated for the native LBA field 138, can be allocated and used for the message field 132. The unused bits of the LBA field 134 represent address blocks of storage capacity that are either reserved by the host 102 and not for user storage purposes or non-existent block addresses of the data storage device 104.

As an example, an LBA field 134 with a total of 48-bits can provide a maximum addressable space that exceeds the maximum block addresses range of the data storage devices 104 with serial interfaces or parallel interfaces and thus provide many unused bits that can be allocated for the message field 132 of the messaging mechanism.

For this example, the LBA field 134 with 48-bits can support a maximum of 281,474,976,710,656 blocks of data. The data storage device 104 with a 512 byte block size and 48-bit LBA field can be used to locate over to $2^{48}$ bytes or 144 PetaByte (PB) within a data storage device unit. A block size (not shown) represents a quantity of data bytes in each block/chunk of data within the data storage device. The block size can vary between systems and data storage devices.

In an example, bit maximums for the LBA field 134 used with data storage devices 104 having different data storage interfaces, for example, can range from 27-bits to 64-bits in length. For example, the bit length of a native LBA field 138 corresponding to a data storage devices 104 having the LBA field 134 with a bit length of 64-bits, is likely to have a native LBA field 138 with a length much less than 64-bits.

In an example, a host 102 with a RAID host controller can have an LBA field 134 of 64-bits. A practical maximum bit length of the native LBA field 138 can be 50-bits in length to avoid performance, latencies, maintenance, and cost issues. All or a portion of remaining unused 14-bits (equivalent to bit 63 down to bit 50, inclusive) can be allocated for a message field 132. For example, if only a 9-bit length is needed/allocated for an embedded message 142 of 8-bits and a message indicator bit 140 located at bit 64 of the LBA field 134, then there remains 5 unused bits of the LBA field 134 that can be allocated, such as for another embedded message 142 with a bit length of 5-bits.

In a manner similar to the configuration of a LBA field 134 having only a single embedded message 142 (as shown in FIG. 1B), the another embedded message 142 can be located between the message indicator bit 140 (bit 63) of the LBA field 134 and the MSB (bit 49) of the native LBA field 138. The embedded message 142 and the another embedded message 142 can each be formed and allocated as separate groups of consecutive bits, between bit 62 and bit 50 of the LBA field 134, inclusive. The specific location of each group can be pre-determined and pre-configured by the host 102.

The embedded message 142 can be grouped in the upper bit portion and the another embedded message 142 grouped in the lower bit portion of a message field 132, or vice versa. In this example, the embedded message 142 can be assigned to the lower bit portion, corresponding to bits 57 through 50 of the LBA field 134, inclusive. The another embedded message 142 can then be assigned to the upper portion, corresponding to bits 62 through 58 of the LBA field 134, inclusive.

In this example, the message field 132 configured with the embedded message 142 and the another embedded message 142 results in the transmission of two messages that are sent in-band within a single I/O command request 136 having a single command code 118 to the data storage device 104 to be processed or executed by the data storage device 104 in-band with a I/O command request 136.

The block size selection can be dependent on applications and usage of a specific data storage device. Some block sizes, for example, can include 512 bytes, 520 bytes, 1024 bytes, 2048 bytes, 4096 bytes, or 8192 bytes used in large logical storage volumes. The product sum of the value of the native maximum address and the number of data bytes number in each block equals the total byte capacity permitted or available for storage in the data storage device.

In an example, the native LBA field 138 of any data storage device 104 can be 40-bits in length with the data storage device 104 formatted with a block size of 512 bytes to provide a total user storage capacity that is less than or equal to 536 TB. The remaining upper 8 unused significant bits of a 48-bit length LBA field 134 can be used to form a message field 132. The message field 132 can include the message indicator bit 140 of the LBA field 134. The 7 bits between the message indicator bit 140 and the native LBA field 138 can be used to deliver the embedded message 142.

The LBA message unit 130 can be aware of the bit length of the native LBA field 138 configured by the host 102 and thus aware of which bits of the LBA field 134 are unused and can represent the message field 132. The host 102 has previously indicated to the LBA message unit 130 the assigned bit position, bit 48 (the MSB of the LBA field 134), is used to represent the message indicator bit 140. The LBA message unit 130 monitors the message indicator bit 140 to indicate and validate that the embedded message 142 is present and to be executed/processed. If the LBA message unit 130 detects that the message indicator bit 140 is set, such as to a high level or a one, then the LBA message unit 130 can extract, capture, process, and save key message information details determined from the embedded message 142.

The LBA message unit 130 can extract the embedded message 142 from the message field 132 of the LBA field 134, decode the embedded message 142 to determine if it is a command or an informational type of message, and prepare the proper message details to appropriate circuitry within the storage controller unit 126 to process and execute. The LBA message unit 130 can guarantee that the proper message details are available to the storage controller unit 126 before it receives the read or write I/O command request 136 having the LBA field 134 with the message field 132 is received or detected by the storage controller unit 126.

Embodiments provide flexibility to increase or decrease the total number of unique embedded messages 142 based on a total bit length of the native LBA field 138. For example, in another embodiment, a user of the data storage device 104 requiring the native LBA field 138 to be larger than the 40-bit length can be provided with a total storage capacity much greater than the 144 PB, resulting in the message field 132 reduced in length.

In another example, the native LBA field 138 set to a 42 bit length would result in the length of the embedded message 142 reduced down to a total of 5-bits. In yet another example, a field bit length of the embedded message 142 can be as small as 1 bit in length to provide only 2 unique embedded messages 142.

In another example, a user of the data storage device 104 can be configured with the native LBA field 138 smaller than the 40-bit length resulting in a total storage capacity much smaller than the 144 PB and allows the message field 132 to increase in length. For example, the native LBA field 138 with a 35-bit length would result in the length of the embedded message 142 increasing up to a total of 12-bits and thus the field bit length of the embedded message 142 can be as large as the total field bit length. As a further example, the native LBA field 138 having a bit length of 1 bit provides the largest number of bits for unique messages and the fewest number of user addressable blocks.

In an embodiment, one or more bits of the embedded message 142 can be used to define an offset tag field 150, shown in FIG. 1B. The offset tag field 150 is an optional feature provided by the messaging mechanism to enable an in-band message of one I/O command request 136 to be offset, applied, and executed in-band with a different I/O command request 136. The different I/O command request 136 can be an I/O command request preceding the one I/O command request 136 or one or more I/O command requests following the one I/O command request 136.

In yet another embodiment, an embedded message 142 with a shortened message 152 and an offset tag field 150 can be sent in-band with a first I/O command request 136. The offset tag field 150 can be used to offset, apply, and execute the shortened message 152 in-band with a second I/O command request 136 immediately following the first I/O command request 136. The second I/O command request 136 can include a first embedded message 142 and a second embedded message 142 to be executed in-band with the second I/O command request 136.

This results in the shortened message 152, the first embedded message 142, and the second embedded message 142 processed, applied, and executed in-band with the second I/O command request 136, without sending or transmitting an additional I/O command request.

The offset tag field 150 can have a bit length of 1 or more consecutive bits of the embedded message 142. Bits of the embedded message 142 not allocated for the offset tag field 150 can be used to form a shortened message 152. Although the offset tag field 150 is shown in FIG. 1B as least significant bits of the embedded message 142, the offset tag field 150 can be positioned and pre-designated by the host 102 to other consecutive bit locations within the bit field of the embedded message 142.

The shortened message 152 can have similar or identical use, functions, attributes, applications, or any combination thereof, as an embedded message 142 without the offset tag field 150. The shortened message 152 has fewer bits than the embedded message 142 without the offset tag field 150 and consequently supports fewer total number of total messages.

The offset tag field 150 can be used to tag, offset, and execute/process the shortened message 152 received in-band to a current I/O command request 136 to either the current I/O command request 136, in-band with a previous I/O command request 136, or in-band with a subsequent I/O command request 136. For example, an offset tag field 150 with a bit length of 2, can designate the shortened message 152 to be applied in-band with either the current I/O command request 136, a preceding I/O command request 136 before the current I/O command request 136, a subsequent I/O command request 136 immediately following the current I/O command request 136, or a second subsequent I/O command request 136 immediately following the current I/O command request 136.

Bit field lengths of the embedded message 142 or the shortened message 152 can be determined based on the length of unused bits of the LBA field 134. For example, a LBA field 134 having a maximum number of 48-bits available, provides for N-bits available for the message field 132 where N is any integer greater than one and less than the message indicator bit 140 (most significant bit location) of the LBA field 134, specifically bit 46 of the LBA field 134. Furthermore, for example, if an offset tag field 150 feature is also implemented using 3-bits of the message field 132, then the resulting Z-bits for the shortened message 152 would be any integer greater than one and less than the most significant bit location—3, specifically bit 43 of the LBA field 134.

In an embodiment, for example, the message field 132 without the offset tag field 150 can be effectively applied to streaming feature command set operations. The host 102 can use streaming feature commands to request data within an allotted time, placing a priority on time to transfer data, order of transfers over data integrity, or any combination thereof, to fully exploit isochronous data streams vital for Audio/Video (AV) type applications.

Each data stream can be actively opened or closed for data I/O using just the embedded message 142 sent in-band with read or write I/O command requests 136 for asynchronous streams. As more and more data stream blocks are added, adding the offset tag field 150 into the embedded message 142 can provide another dimension to operate multiple streams as broken or random bursts. The offset tag field 150 can maximize A/V data delivery throughput, better synchronize any time critical burst to synchronous processes, and better manage time priorities of each stream block.

In another embodiment, use of the messaging mechanism with the message field 132 and the offset tag field 150 permits multiple data streams to be actively managed in-band quickly and efficiently. The offset tag field 150 can provide greater granularity to open and close individual streams between data stream blocks using the I/O command requests 136 with the command codes 118 for streaming. The shortened message 152, tagged or associated in-band with different I/O command requests 136, eliminates any need for issuing many separate open and close commands which add substantial overhead to and wasted bandwidth of the storage device interface 106.

Either the embedded message 142 or the shortened message 152 can be a control type command message, such as start/open or stop/close data stream, sent with the I/O command requests 136 to stream or not stream data, respectively. The embedded message 142 or the shortened message 152 using the offset tag field 150, provide the capability to dynamically control in-band the individual data flows for each of the stream blocks.

In an embodiment, the embedded message 142 or the shortened message 152 can be used to provide command messages for intermittent diagnosis, in-band temporal testing, system performance evaluations, diagnostics/debug, or any combination thereof. For example, unusual or exceptional read/write symptoms can be effectively analyzed/studied by triggering data capture circuitry of signals, status, or memory data at key points of time such as before the start, during, or ending of a read or write command. In another example, a command type message of the shortened message 152 can used to evaluate performance of hardware or software during a period after a read data I/O and subsequent write I/O command has completed, but before another read data I/O command starts.

In another embodiment, informational messages can be used to dynamically switch or alternate between operational configurations. For example, an informational type of message can be defined to momentarily reconfigure the LBA message unit 130 from a mode of embedded messages 142 without the offset tag field 150 to having shortened messages 152 with the offset tag field 150. In another example, another informational type of message can be defined to momentarily reconfigure from a mode of shortened messages 152 with the offset tag field 150 to having embedded messages 142 without the offset tag field 150.

Embodiments of the messaging mechanism can be allocated to bits of the LBA field 134 that are not allocated as bits of the native LBA field 138. As such, the messaging mechanism is independent of any device interface type, such as a parallel or serial interface, as examples.

The messaging mechanism described herein can be applied to any data storage device, such as a SATA, PATA, Solid State Drive (SSD), SAS, ATA, NVMe, FCI, or Firewire/1394 data storage devices having LBA fields 134 with a bit portion used for the native LBA field 138. Therefore, the messaging mechanism can be implemented with any data storage device using LBA fields, such as the LBA field 134 as described in the embodiments and scope of the invention.

As an example, the following calculations can be derived and used to plan and provide for the integration of the messaging mechanism architecture, configured without the offset tag field 150:

$$\text{Log}_2(\text{targeted maximum native capacity/Bytes per sector}) = I^*$$

Where: 'Bytes per sector' is the number of Bytes desired for each sector of data storage device.

'$I^*$' is either an integer or a calculate value of I that has subsequently been rounded up to the next largest integer value. The integer value (whether calculated or calculated and rounded up) is the required number of bits needed for the native LBA field 138 to support the targeted maximum native capacity.

$$(\text{Maximum Length of the LBA field } \mathbf{134}) - I^* - 1 = EMB$$

Where: 'EMB' is the total number of available bits for the embedded message 142.

Embodiments of FIGS. 1A and 1B, with the messaging mechanism derived from unused upper bits of the LBA field 134 can be used as the message field 132 to send the message indicator bit 140 and at least one embedded message 142 in-band as part of the LBA field 134 of an I/O command request 136 to the data storage device 104.

Embodiments of FIGS. 1A and 1B, with the messaging mechanism are flexible and adaptable and can accommodate various data storage devices 104 with the native LBA field 138 having a specific length. The bit length of message field 132 can increase and decrease as the native LBA field 138 decreases or increases, respectively.

Embodiments of FIGS. 1A and 1B, of the messaging mechanism having a message field 132 with an embedded message 142 for multi streaming environments, test/debug, and the reduction or elimination of excessive interface I/O transfer cycles can provide for the in-band delivery of either command messages or informational messages that would otherwise require additional I/O command requests without the messaging mechanism.

An embodiment of FIG. 1B of the messaging mechanism with a message field 132 having an embedded message 142 and another embedded message 142 sent in-band within an I/O command request 136 using unused bits of the LBA field 134 can provide the benefit of transmitting two unique messages without the need for another I/O command request 136 to transmit either or both messages.

An embodiment of FIG. 1B of the messaging mechanism with an offset tag field 150 can enable a message transmitted in-band to one I/O command request 136 to be offset, applied, and executed in-band with a different I/O command request 136.

An embodiment of FIG. 1B of a shortened message 152 sent or transmitted in-band with a first I/O command request 136 followed by an embedded message 142 and another embedded message 142 sent or transmitted in-band with a second I/O command request 136 can be all applied and executed in-band with the second I/O command request 136, resulting in three messages executed or processed in-band with the second I/O command request 136 without any additional I/O command requests 136.

In another example, an embedded message 142 and another embedded message 142 sent or transmitted in-band with a first I/O command request 136 followed by a shortened message 152 sent or transmitted in-band with a second I/O command request 136 can be all applied and executed in-band with the first I/O command request 136, resulting in three messages executed or processed in-band with the first I/O command request 136 without any additional I/O command requests 136.

Embodiments of the hardware pipeline processing architecture with the storage interface unit 120, the LBA message unit 130, and the storage controller unit 126 provide an architectural overview of the messaging mechanism. The storage controller unit 126 receives the I/O command request 136 from the storage device interface 106 at the beginning of a pipe implemented in hardware.

In some embodiments, the I/O command requests 136 include the LBA field 134 and the LBA field 134 can include the message field 132 with the message indicator bit 140 and the embedded message 142 or the shortened message 152 with associated offset tag field 150. The LBA message unit 130, connected to the storage interface unit 120 can be used is for processing, extracting one or more embedded message 142, or any combination thereof, from the LBA field 134, a shortened message 152 and the offset tag field 150 adjacent the shortened message 152 from the LBA field, or any combination thereof, as needed. The LBA message unit 130 processes any message field 132, detected using the message indicator bit 140, and generates messaging information for an eventual use by the storage controller unit 126. The messaging information contain values associated to embedded messages 142 or shortened messages 152 to be evaluated by the storage controller unit 126.

In some embodiments, the storage controller unit 126 receives the I/O command requests 136, previously processed by the LBA message unit 130, exiting the pipe. The I/O counter 128 of the storage controller unit 126 assigns a unique value of the I/O counter 128 to each I/O command request 136 exiting the pipe. The storage controller unit 126 compares each unique value against values contained in the messaging information previously generated by the LBA message unit 130.

Any comparison matches of the unique value and the values in the messaging information can result in the storage controller unit 126 processing or executing the embedded messages 142 or the shortened messages 152 associated with the values in the messaging information. The storage controller unit 126 can process or execute the embedded messages 142 or the shortened messages 152 in-band with a specific I/O command request 136.

Thus, in some embodiments, the messaging mechanism provides a capability for the host 102 to transmit and the data storage device 104 to receive a message field 132 in-band with an I/O command request 136, and also instruct the data storage device 104 to process or execute the information of the message field 132 in-band with either the I/O command request 136 or a different I/O command request 136 identified by the host 102 usage of the offset tag field 150.

In some embodiments, the LBA message unit 130 can detect, extract, analyze, and pre-process the message field 132 independently and without assistance from the storage controller unit 126, the storage medium 124, and the storage electronics 122. The LBA message unit 130 generates messaging information for the storage controller unit 126 to process or execute the message information contained within the message field 132. The storage controller unit 126 and the storage electronics 122 can independently processes I/O command requests 136 with the native LBA field 138 without any assistance from the LBA message unit 130. The storage controller unit 126 may simply processes or executes the messaging information from the LBA message unit 130 in parallel or concurrent with the processing of the I/O command requests 136.

It has been discovered that embodiments of the message mechanism provide maximum functional utilization, minimal circuitry interaction, and minimal development/product cost by provide maximum functional utilization, minimal circuitry interaction, and minimal development/product cost by having the LBA message unit 130 detect, extract, analyze, and pre-process the message field 132 independently and without assistance from the storage controller unit 126, and also having the storage electronics 122 and the storage controller unit 126 independently processes I/O command requests 136 with the native LBA field 138 without any assistance from the LBA message unit 130, and thus, enabling the storage controller unit 126 to process or execute the messaging information from the LBA message unit 130 in parallel or concurrent with the processing of the I/O command requests 136.

It has been discovered that embodiments of the message mechanism provide tremendous savings in development, product, manpower, and parts cost for the developers, manufacturers, and end consumers since the circuitry can be implemented and added to any device having a storage medium, such as the storage medium 124, with a logical block addressing scheme, such as the LBA field 134, and because irrespective of interface type, physical interface medium, or type of host controller 114, the circuitry can be easily incorporated into the device to provide the functionality and benefits of the message mechanism.

Figure 2:
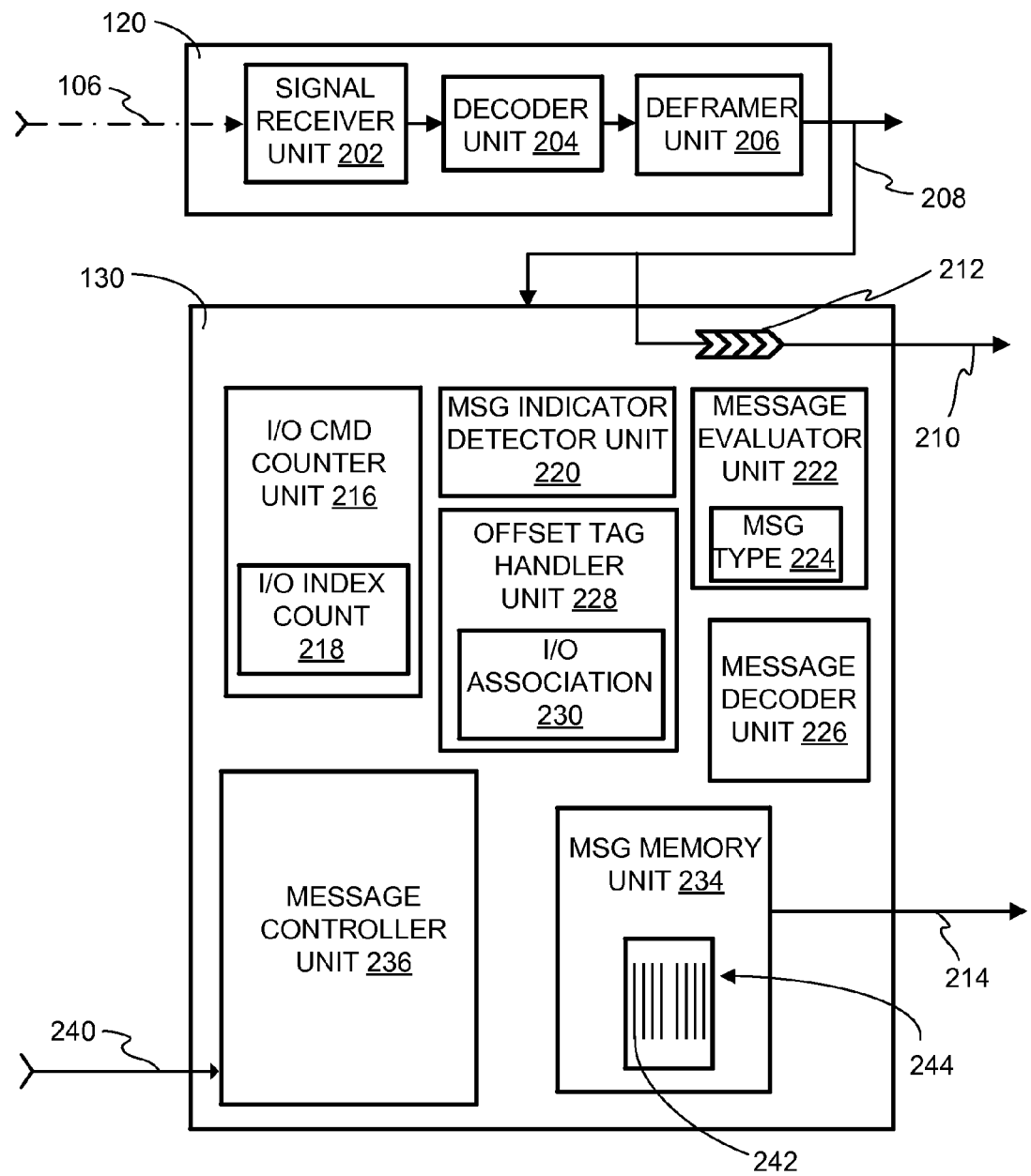
FIG. 2 is an example of hardware circuit functions within the storage interface unit and the logical block address message unit used to detect, identify, and process the message field of the LBA field in an embodiment of the invention.

Referring now to FIG. 2, therein is shown an example of hardware circuit functions within the storage interface unit 120 and the LBA message unit 130 used to detect, identify, and process the message field 132 of FIG. 1A of the LBA field 134 of FIG. 1A in an embodiment of the invention. Shown are the storage interface unit 120 and the LBA message unit 130 of the data storage device 104.

The storage interface unit 120 can include a signal receiver unit 202, a decoder unit 204, and a framer unit 206 circuitry. Portions of circuitry within the storage interface unit 120, the LBA message unit 130, or any combination thereof, can include software/firmware stored or loaded into the circuitry, to enable configuration customizations, accommodate requests from the host 102 of FIG. 1A, accommodate requests from system users, or any combination thereof.

Signals sent from the host 102 of FIG. 1A can be received on the storage device interface 106 and detected and translated to for example, a 10-bit binary serial stream, by the signal receiver unit 202 of the storage interface unit 120. The 10-bit binary stream can be sent to the decoder unit 204. The decoder unit 204 descrambles and decodes the framed 10-bit binary stream into framed 8-bit data and control codes that are sent to the deframer unit 206.

The deframer unit 206 decomposes the framed 8-bit data using the control codes and extracts single bytes, 2-bytes (words), and 4-bytes into 4-byte double words (dwords) to send out as data outputs 208 as 8, 16, and 32 bit data, respectively. The data outputs 208 can also include control signals, data, the LBA bytes, and other byte fields of the I/O command request 136, such as the command code 118, feature bytes, sector count bytes, a device/head byte of the I/O command request 136, as examples.

The data outputs 208 of the deframer unit 206 can be distributed to circuitry, firmware/software, or any combination thereof, within the data storage device 104 of FIG. 1A, including circuitry of the LBA message unit 130 and the storage controller unit 126 of FIG. 1A. The LBA message unit 130 can be connected directly to data outputs 208 to immediately process, generate, organize, and group the messages with messaging information produced by the LBA message unit 130 as soon as the LBA fields 134 of I/O command requests 136 are available at the data outputs 208. Early outputs 214 of the LBA message unit 130 can be coupled or connected to the storage interface unit 120. The early outputs 214 are used to send the messaging information and the messages to the storage controller unit 126 to process or execute in-band with the I/O command requests 136.

The storage controller unit 126 can receive delayed data outputs 210 after a pre-determined elapsed time delay from a pipeline 212 based on a hardware pipeline processing architecture. For example, the pipeline 212 can be formed by a series of synchronized memory delay elements. Some examples of synchronized delay elements can include latches, registers, RAM, or SRAM clocked by a clock or clock multiple of a byte clock from the storage interface unit 120. The pipeline 212 can be external to the LBA message unit 130 or incorporated within the LBA message unit 130, as shown in FIG. 2.

The time delay of the pipeline 212 creates a total elapsed time for data to enter and exit opposite ends of the pipeline 212. The pipeline 212 can guarantee that the message and messaging information outputs from the LBA message unit 130 is ready and available before the storage controller unit 126 receives the I/O command request 136 from the delayed data outputs 210.

The LBA message unit 130 can include an I/O command counter unit 216 with an I/O index count 218, a message indicator detector unit 220, an embedded message evaluator unit 222, an offset tag handler unit 228, a message decoder unit 226, a message memory unit 234, and a message controller unit 236. Circuitries of the I/O command counter unit 216, the message indicator detector unit 220, the message evaluator unit 222, the offset tag handler unit 228, and the message memory unit 234 can have access to the inputs, the data outputs 208, or a combination thereof, of the deframer unit 206.

The inputs, the data outputs 208, or a combination of the inputs and the data outputs 208 of the deframer unit 206 are used to monitor the framed 8-bit data stream, the bytes, the words, the dwords, or any combination thereof, for the message indicator bit 140 of FIG. 1B and to minimize circuit fan-out loading of the decoder unit 204 and the deframer unit 206 outputs. The message memory unit 234 can be used to store the message and messaging information outputs for the storage controller unit 126. The message memory unit 234, for example, can include volatile memory, non-volatile memory, or any combination thereof.

Initialization of the storage interface unit 120 can include initializing the message controller unit 236 with LBA configuration information 240 from the storage controller unit 126 of FIG. 1A. The message controller unit 236 can monitor and supervise the embedded message 142 of FIG. 1B or the shortened message 152 of FIG. 1B. The message controller unit 236 can also distribute the embedded message 142 of FIG. 1B or the shortened message 152 to appropriate circuitry external to the LBA message unit 130, if requested by the storage controller unit 126 or to assist the storage controller unit 126 with message executions.

The message controller unit 236 can also provide additional messaging information including the I/O index count 218, control, and selecting signals to circuitry receiving or using either the embedded message 142 or the shortened message 152. The I/O index count 218 of the I/O command counter unit 216 is initially reset to a count value of zero prior to the transmission of any read or write I/O command request 136 between the host 102 and the storage medium 124 of FIG. 1A.

The LBA configuration information 240 can include the bit length of the LBA field 134 of FIG. 1B containing the MSB of the native LBA field 138 of FIG. 1B. The next most significant bit, relative to the MSB of the native LBA field 138, can be used by the message controller unit 236 to identify the Least Significant Bit (LSB) of the embedded message 142 of FIG. 1B.

The message controller unit 236 can send the bit position of the message indicator bit 140 and the bit position of the LBA field 134 containing the LSB of the embedded message 142 to the message evaluator unit 222, the message decoder unit 226, and the offset tag handler unit 228 before the first I/O command request 136 for reading or writing is sent from the host 102.

If enabled by the LBA configuration information 240, the offset tag handler unit 228 of the LBA message unit 130 can also be used for extracting, processing, and decoding the offset tag field 150 and shortened message 152 from the embedded message 142. The offset tag handler unit 228 can extract the offset tag field 150 based on a bit length and field location information included in the LBA configuration information 240.

As read or write type I/O command requests 136 with LBA fields 134 are detected by the I/O command counter unit 216, the I/O index count 218 of the I/O command counter unit 216 can be incremented to effectively create an index value corresponding to each received I/O command request 136. In parallel, the message indicator detector unit 220 of the LBA message unit 130 can monitor the message indicator bit 140 of each LBA field 134 to detect an active or set bit condition to determine if the LBA field 134 has an embedded message 142.

If an embedded message 142 is detected by the message indicator detector unit 220, then the message evaluator unit 222 and the message decoder unit 226 can be activated. The message evaluator unit 222 then decodes and evaluates the embedded message 142 to determine a message type 224. The message type 224 can, for example, be a command type of message or an informational type of message. The message type 224 can be used to presort the messages for the message decoder unit 226.

The message decoder unit 226 can evaluate the message type 224, as the message controller unit 236 decodes the embedded message 142, to assist the message controller unit 236 determine which circuitry area the message is to be targeted or to be notified. For example, the message, the I/O index count 218 associated with the message, the message type 224, and targeted circuitry information can be saved by the message controller unit 236 into the message memory unit 234 as part of the messaging information.

If the LBA message unit 130 has been configured to indicate that each of the embedded messages 142 contains an offset tag field 150, then the offset tag handler unit 228 can also be activated. The offset tag handler unit 228 extracts a shortened message 152 from the embedded message 142 and decodes the offset tag field 150 to generate an I/O association 230. The I/O association 230 can be used to indicate to the message controller unit 236 that the shortened message 152 is to be associated or tagged to be executed with either the previous I/O command request 136 or a subsequent I/O command request 136.

The message controller unit 236 can detect the I/O association 230 and adjust the I/O index count 218 by decrementing or incrementing the I/O index count 218, as required to properly apply or execute the shortened message 152 in-band with either the previous or subsequent I/O command request 136, respectively. The offset tag handler unit 228 can be configured for extracting the shortened message 152 and decoding the offset tag field 150. The offset tag handler unit 228 can be configured to provide additional functions to load balance, assist the message controller unit 236 tasks, or any combination thereof, such as determining if the current I/O command request 136 or if a previous or subsequent I/O command request 136 is to be associated with the shortened message 152 that is currently being processed.

After the I/O index count 218 has been validated and adjusted as needed, the I/O index count 218 can be stored in the message memory unit 234 and subsequently referred to as a validated index 242 by the storage controller unit 126. Note, if the LBA message unit 130 has not been configured for embedded messages 142 with offset tag fields 150, then the I/O index count 218 can be validated and saved as the validated index 242.

The embedded message 142 or the shortened message 152, the validated index 242, and the intended targeted circuitry information can be saved by the message controller unit 236 into the message memory unit 234 and can be referred to as message metalinks 244 of the messaging information.

As each of the I/O command requests 136 exit the pipeline 212 as part of the delayed data outputs 210 and are received by the circuitry of the storage controller unit 126 of FIG. 1A, the value of the I/O counter 128 can be compared with values of the validated index 242 in the message metalinks 244. The message and targeted circuitry information corresponding to each validated index 242 in the message metalinks 244 that match the I/O counter 128 can be processed or executed by the storage controller unit 126 in-band with the I/O command request 136 received by the storage controller unit 126. Together the storage controller unit 126 with the I/O counter 128 and the messaging information that includes the validated index 242 can be used to execute an embedded message 142, a shortened message 152 with an offset tag field 150, a shortened message 152 without an offset tag field 150, or any combination thereof, in-band with the processing or execution of the I/O command request 136 by the storage controller unit 126.

The pipeline architecture ensures that the LBA message unit 130 has processed and generated the message metalinks 244 before the storage controller unit 126 and the I/O counter 128 encounters any of the message metalinks 244 with a message requiring processing and execution. Thus, the storage controller unit 126 is connected to the LBA message unit 130 in such a way as to receive and apply the embedded message 142 or the shortened message 152 in the message metalinks 244 to the data storage device 104. The process or execution of the embedded message 142 or the shortened message 152 can be triggered when the storage controller unit 126 has received and decoded the command code 118 from the delayed data outputs 210.

Other signals (not shown) can be sent to the host 102, from the data storage device 104, representing information such as data, status, acknowledgement, or error information. Other hardware units (not shown) within the storage interface unit 120 can be used to generate and transmit such other signals.

It has been discovered that embodiments of the message mechanism provide substantial improvement of efficiency and utilization of the storage device interface 106 and with no perceivable overhead or performance impact to the operation of the host 102, the storage device interface 106, the data storage device 104, or any combination thereof, as a result of the data storage device 104 with the combination of the storage interface unit 120 and the LBA message unit 130 providing the host 102 with the capability to send an embedded message 142 within the LBA field 134 in-band with an I/O command request 136 on the storage device interface 106 of the data storage device 104 to provide additional command or informative messages without additional I/O command.

It has been discovered that embodiments of the message mechanism provide superior granularity control of when the embedded message 142 is to be processed or executed, and with which I/O command request 136 the embedded message is to be executed in-band. The superior granularity control discovery is provided by the functions and options of the I/O index count 218, the message controller unit 236, the offset tag handler unit 228, the message memory unit 234, or any combination in conjunction with the pipeline 212 used to form the pipeline architecture to provide the data storage device 104 the capability to control and offset the shortened message 152 received from the host 102 before processing or executing the embedded message 142 in-band with an I/O command request 136 that is different from the I/O command request originally used by the host 102 to send (in-band) the embedded message 142.

It has been discovered that embodiments can provide a new unlimited host 102 messaging capacity for improved host I/O task management and performance as a result of the data storage device 104 having the offset tag handler unit 228, the offset tag field 150, the I/O index count 215, the message indicator detector unit 220, the message evaluator unit 222, and the message decoder unit 226 of the LBA message unit 130 provide additional parallel processing capability to handle many embedded message fields 142 received in-band within I/O command requests 136 received from the host 102.

It has been discovered that embodiments provide for enhanced messaging payload capacity to increase messaging efficiency by using the offset tag handler unit 228, the offset tag field 150, the I/O index count 215, the message controller unit 236, the message memory unit 234, the I/O counter 128, the storage controller unit 126, or a combination thereof, to provide the data storage device 104 with the capability to process or execute an embedded message 142 and a shortened message 152 (sent from the host 102 in-band with a different I/O command request 136) in-band with the a single I/O command request 136 to provide the capability to process or execute two messages in parallel.

It has been discovered that embodiments optimize the performance of the electronic system 100 by providing in-band messaging payload process/execution while maintaining the throughput, performance, and data bandwidth throughout the electronic system 100 with the message mechanism based on the offset tag handler unit 228, the offset tag field 150, the I/O index count 215, the I/O command counter unit 216, the message indicator detector unit 220, the message evaluator unit 222, the message decoder unit 226, the message controller unit 236, the message memory unit 234, the I/O counter 128, and the storage controller unit 126, provide the data storage device 104 with the capability to process or execute two or more embedded messages 142 sent in-band with a first I/O command request 136 and at least one shortened message 152 sent from the host 102 in-band with a second I/O command request 136 to provide the capability to process, execute, or any combination thereof, three messages in-band with the first I/O command request 136.

It has been discovered that embodiments eliminate or prevent design/development co-dependencies or bottlenecks between the hardware of the host 102 and software of the data storage device 104 to minimize development work, mitigate risks, and reduce product costs and time to market for developers and manufacturers of the hosts 102 and the data storage devices 104, and particularly for the software engineers of the data storage device 104 and the hardware engineers of the host 102. The hardware engineers of the host 102 can be agnostic to the message mechanism since adding the hardware units and circuitry of the LBA message unit 130 and circuit modifications to the storage controller unit 126 to process and execute the message field 132 are external to the host 102. The software engineers of the data storage device 104 can be agnostic to the message mechanism software since software changes are in the host 102 for proper use, interpretation, and relationships of the message field 132 and the native LBA field 138 of the LBA field 134, and not in the data storage device 104.

Figure 3:
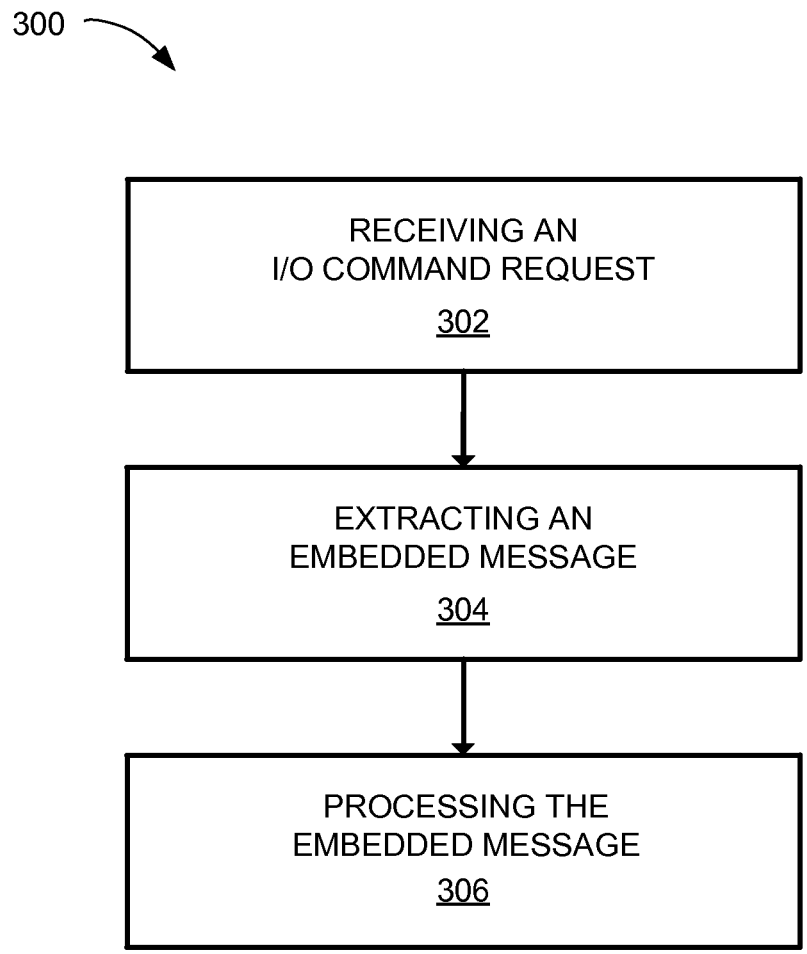
FIG. 3 is a flow chart of a method of operation of an electronic system in an embodiment of the invention.

Referring now to FIG. 3, therein is shown a flow chart of a method 300 of an electronic system 100 in an embodiment of the invention. The method 300 includes: receiving an I/O command request with a logical block address field in a block 302; extracting an embedded message from the logical block address field in a block 304; and processing the embedded message in a block 306.

The resulting method, process, apparatus, device, product, system, or any combination thereof, is straightforward, cost-effective, uncomplicated, highly versatile, accurate, sensitive, and effective, and can be implemented by adapting known components for ready, efficient, and economical manufacturing, application, and utilization. Another important aspect of an embodiment of the invention is that it valuably supports and services the historical trend of reducing costs, simplifying systems, and increasing performance.

These and other valuable aspects of an embodiment of the invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
   a storage interface unit configured to receive an I/O command request with a logical block address field including a message field, wherein the message field is allocated from the logical block address field corresponding to addressable space exceeding the maximum address range of a storage medium;
   a logical block address message unit, connected to the storage interface unit, configured to extract an embedded message from the message field of the logical block address field; and
   a storage controller unit, connected to the logical block address message unit, configured to process the embedded message.

2. The system as claimed in claim 1 wherein the storage controller unit is configured to execute the embedded message in-band with the I/O command request.

3. The system as claimed in claim 1 wherein the logical block address message unit is configured to extract a further embedded message from the logical block address field.

4. The system as claimed in claim 3 wherein the storage controller unit is configured to:
   process the further embedded message; and
   execute the embedded message and the further embedded message in-band with the I/O command request.

5. The system as claimed in claim 3 wherein the logical block address message unit is configured to:
   extract a shortened message from the further embedded message; and
   extract an offset tag field from the further embedded message.

6. The system as claimed in claim 5 wherein the storage controller unit is configured to execute the embedded message and the shortened message, based on the offset tag field, in-band with the I/O command request.

7. The system as claimed in claim 5 wherein the storage controller unit is configured to:
   execute the embedded message in-band with the I/O command request; and
   execute the shortened message, based on the offset tag field, in-band with a different I/O command request.

8. The system as claimed in claim 3 wherein:
   the storage interface unit is configured to receive a different I/O command request with a different logical block address field;
   the logical block address message unit is configured to extract a shortened message from the different logical block address field; and
   the storage controller unit is configured to process the shortened message.

9. The system as claimed in claim 8 wherein the storage controller unit is configured to:
   process the shortened message and the another embedded message; and
   execute the embedded message, the further embedded message, and the shortened message, based on an offset tag field of the different logical block address field, in-band with the I/O command request.

10. The system as claimed in claim 1 wherein the storage interface unit is configured to receive the embedded message and a message indicator of the logical block address field in-band with the I/O command request.

11. A method of operation of an electronic system comprising:
   receiving an I/O command request with a logical block address field including a message field, wherein the message field is allocated from the logical block address field corresponding to addressable space exceeding the maximum address range of a storage medium;
   extracting an embedded message from the message field of the logical block address field; and
   processing the embedded message.

12. The method as claimed in claim 11 wherein processing the embedded message includes executing the embedded message in-band with the I/O command request.

13. The method as claimed in claim 11 further comprising extracting a further embedded message from the logical block address field.

14. The method as claimed in claim 13 further comprising:
   processing the further embedded message; and
   executing the embedded message and the further embedded message in-band with the I/O command request.

15. The method as claimed in claim 13 further comprising:
   extracting a shortened message from the further embedded message; and
   extracting an offset tag field from the further embedded message.

16. The method as claimed in claim 15 further comprising executing the embedded message and the shortened message, based on the offset tag field, in-band with the I/O command request.

17. The method as claimed in claim 15 further comprising:
   executing the embedded message in-band with the I/O command request; and
   executing the shortened message, based on the offset tag field, in-band with a different I/O command request.

18. The method as claimed in claim 13 further comprising:
   receiving a different I/O command request with a different logical block address field;
   extracting a shortened message from the different logical block address field; and
   processing the shortened message.

19. The method as claimed in claim 18 further comprising:
   processing the shortened message and the further embedded message; and
   executing the embedded message, the further embedded message, and the shortened message, based on an offset tag field of the different logical block address field, in-band with the I/O command request.

20. The method as claimed in claim 11 wherein receiving the I/O command request includes receiving the embedded message and a message indicator of the logical block address field in-band with the I/O command request.

* * * * *